(12) United States Patent
Suwa et al.

(10) Patent No.: US 11,898,726 B2
(45) Date of Patent: Feb. 13, 2024

(54) LIGHT IRRADIATION DEVICE INCLUDING REFLECTION SURFACES AND A ROTATION MECHANISM

(71) Applicant: Mitsubishi Electric Corporation, Tokyo (JP)

(72) Inventors: Masashige Suwa, Tokyo (JP); Ritsuya Oshima, Tokyo (JP); Muneharu Kuwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/909,756

(22) PCT Filed: Mar. 13, 2020

(86) PCT No.: PCT/JP2020/011139
§ 371 (c)(1),
(2) Date: Sep. 7, 2022

(87) PCT Pub. No.: WO2021/181662
PCT Pub. Date: Sep. 16, 2021

(65) Prior Publication Data
US 2023/0103239 A1 Mar. 30, 2023

(51) Int. Cl.
*F21V 14/04* (2006.01)
*B60Q 1/076* (2006.01)
(Continued)

(52) U.S. Cl.
CPC .............. *F21V 14/04* (2013.01); *B60Q 1/076* (2013.01); *F21S 41/675* (2018.01); *G02B 26/105* (2013.01)

(58) Field of Classification Search
CPC ......... F21V 14/04; B60Q 1/076; F21S 41/375
See application file for complete search history.

(56) References Cited

U.S. PATENT DOCUMENTS 4,871,904 A 10/1989 Metlitsky et al.
6,587,246 B1 7/2003 Anderton et al.
(Continued)

FOREIGN PATENT DOCUMENTS

JP 1-196682 A 8/1989
JP 2002-45668 A 2/2002
(Continued)

OTHER PUBLICATIONS

International Search Report and Written Opinion dated Apr. 21, 2020, received for PCT Application PCT/JP2020/011139, Filed on Mar. 13, 2020, 10 pages including English Translation.
(Continued)

*Primary Examiner* — Joseph L Williams
(74) *Attorney, Agent, or Firm* — XSENSUS LLP

(57) ABSTRACT

A light irradiation device includes a light source, a first reflecting surface, a second reflecting surface and a rotation mechanism that rotates the first reflecting surface around a first central axis passing through a center of the first reflecting surface and rotates the second reflecting surface around a second central axis passing through a center of the second reflecting surface. The first central axis is orthogonal to a first reference surface that is 45 degrees inclined with respect to a first plane that is orthogonal to an optical axis of light incident upon the first reflecting surface, the second central axis is orthogonal to a second reference surface parallel to the first reference surface, and the first reflecting surface is inclined with respect to the first reference surface and the second reflecting surface is inclined with respect to the second reference surface.

20 Claims, 9 Drawing Sheets

(51) Int. Cl.
*F21S 41/675* (2018.01)
*G02B 26/10* (2006.01)

(56) References Cited

U.S. PATENT DOCUMENTS

| | | |
|---|---|---|
| 2008/0239447 A1 | 10/2008 | Chen et al. |
| 2009/0046474 A1 | 2/2009 | Sato et al. |
| 2020/0158307 A1 | 5/2020 | Kanamori |

FOREIGN PATENT DOCUMENTS

| | | |
|---|---|---|
| JP | 2002-524767 A | 8/2002 |
| JP | 2003-5312 A | 1/2003 |
| JP | 2009-48786 A | 3/2009 |
| JP | 2016-75858 A | 5/2016 |
| WO | 2019/021913 A1 | 1/2019 |

OTHER PUBLICATIONS

Notice of Reasons for Refusal dated May 31, 2022, received for JP Application No. 2022-505691, 19 pages including English Translation.

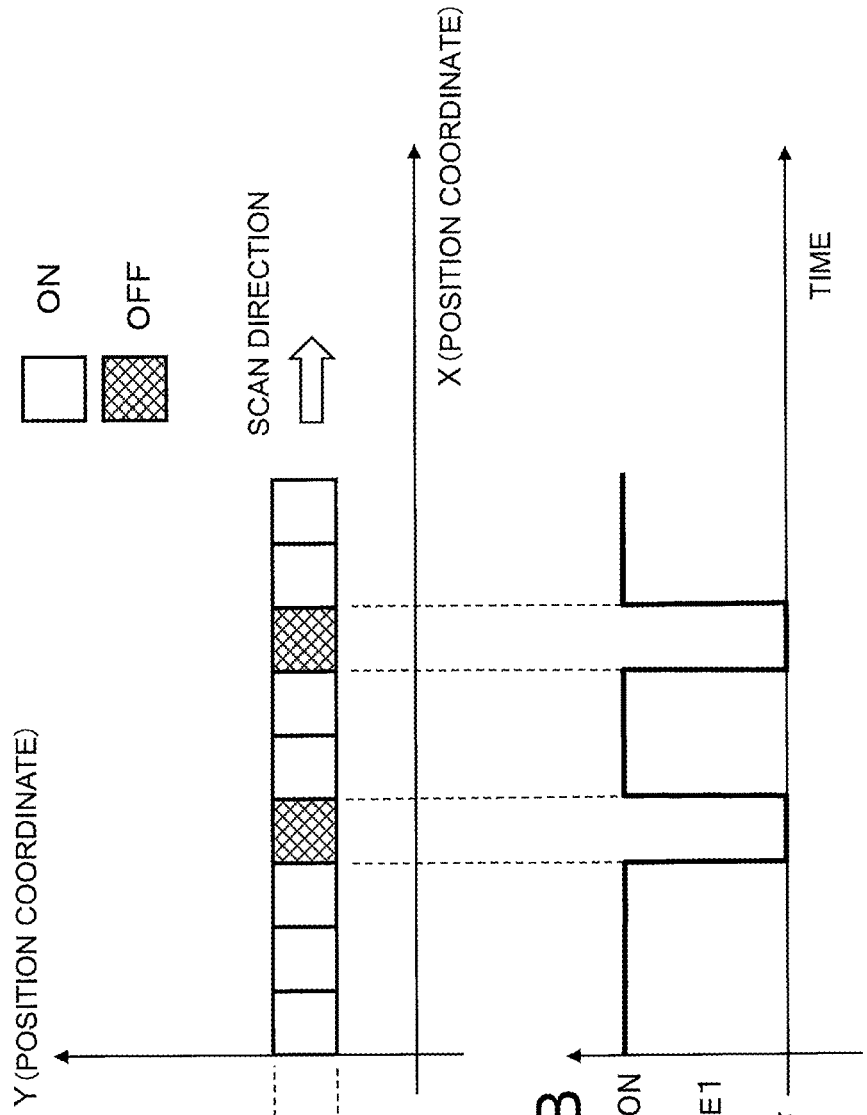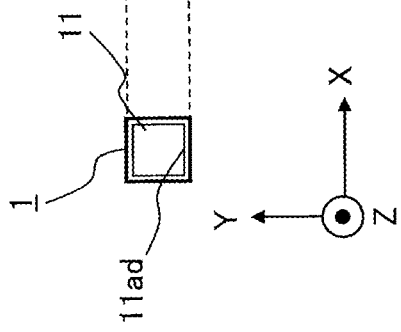

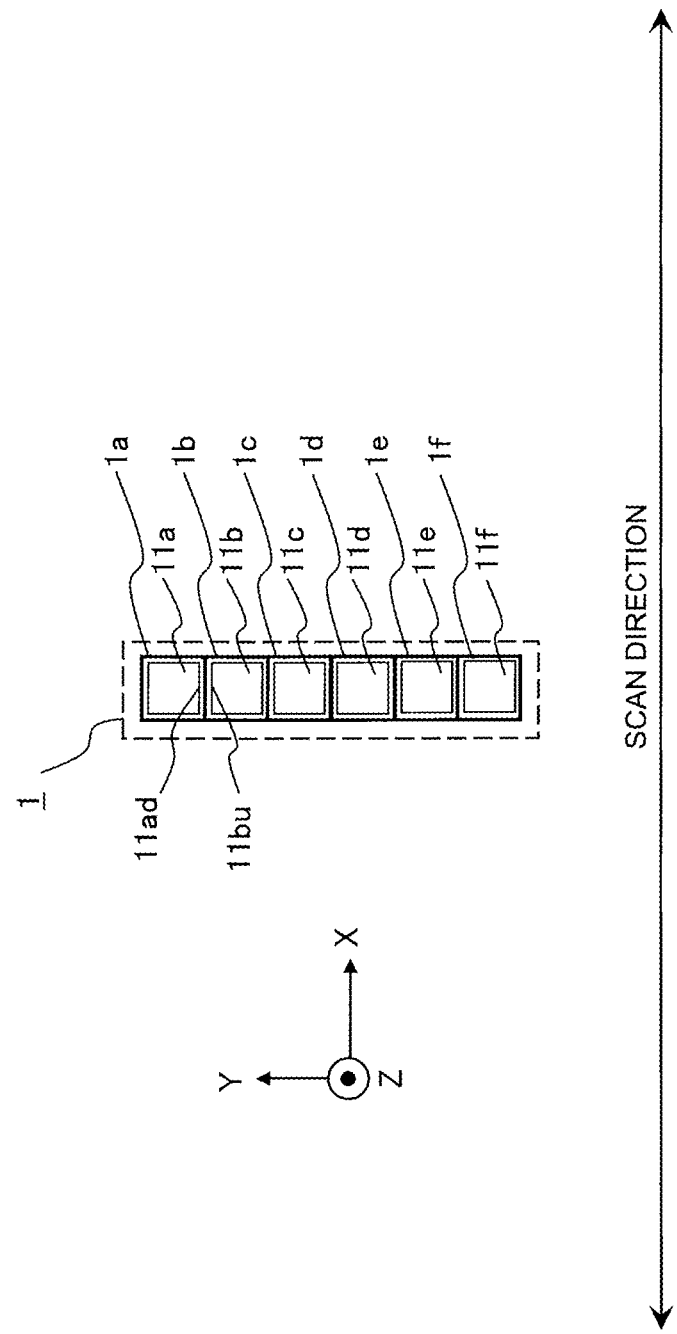

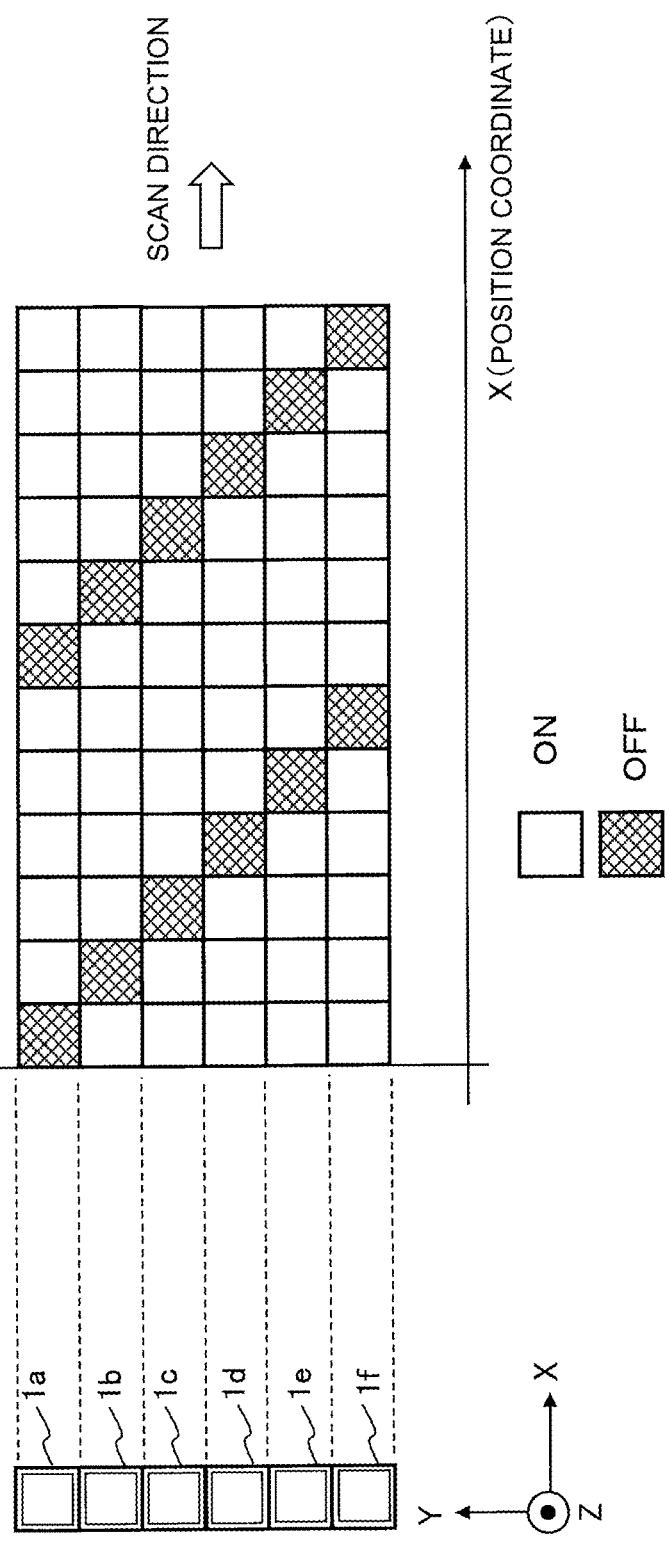

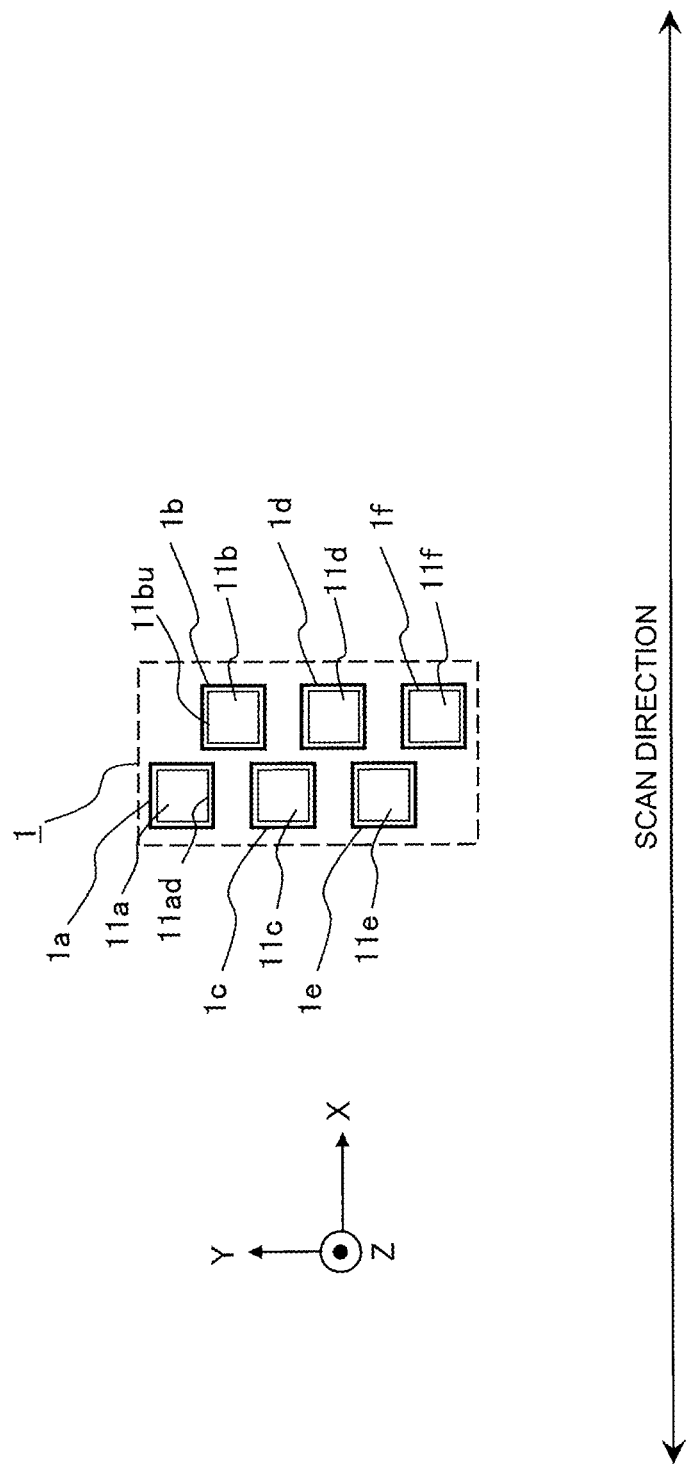

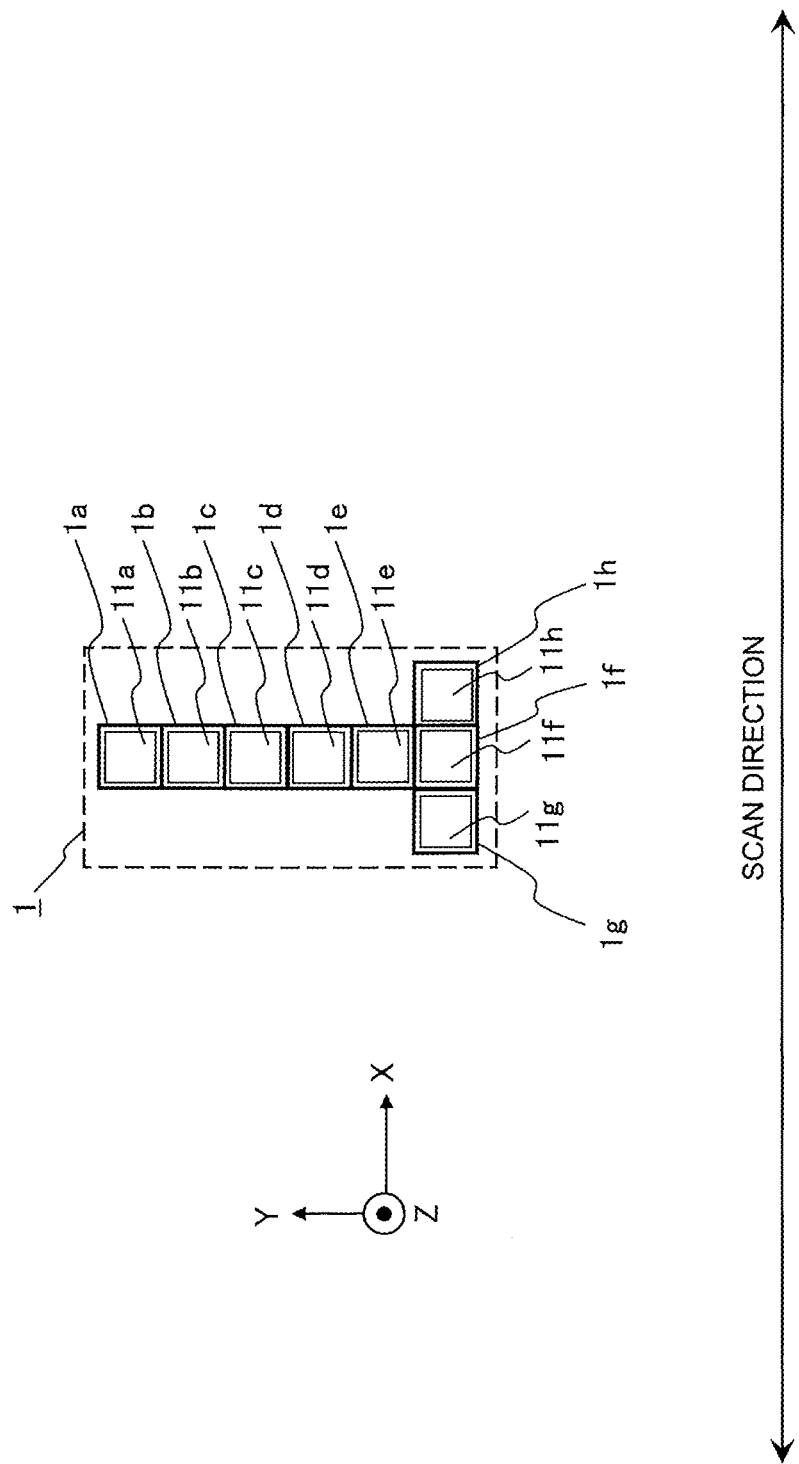

LIGHT IRRADIATION DEVICE INCLUDING REFLECTION SURFACES AND A ROTATION MECHANISM

CROSS-REFERENCE TO RELATED APPLICATION

The present application is based on PCT filing PCT/JP2020/011139, filed Mar. 13, 2020, the entire contents of which is incorporated herein by reference.

TECHNICAL FIELD

The present disclosure relates to a light irradiation device.

BACKGROUND ART

For example, Patent Reference 1 describes a multidirectional optical scanner that emits a scan pattern like petals (e.g., a scan pattern including a plurality of loop shapes) by scanning laser light emitted from a light source by using two mirrors inclined with respect to a rotation axis by angles different from each other.

PRIOR ART REFERENCE

Patent Reference

Patent Reference 1: Japanese Patent Application Publication No. H1-196682 (see FIG. 1, for example)

SUMMARY OF THE INVENTION

Problem to be Solved by the Invention

However, when a light source having a large-area light emission surface and a large light divergence angle (e.g., LED (Light Emitting Diode) or the like) is used in the above-described optical scanner, there is a problem in that the size of each mirror for reflecting the light emitted from the light source enlarges and consequently the drive load for rotating the mirror increases. For example, although the Patent Reference 1 shows examples of adjusting the inclination of each mirror with respect to the rotation axis by providing a support with an inclined end, by adjusting the spacing between the support and the mirror by using a hinge and a screw 40 in a mechanism connecting the support and the mirror, and so forth, all of the examples are those employing a point source of light. The Patent Reference 1 makes no disclosure in regard to the problem with the drive load due to the enlargement of the mirrors and relationship among the rotation axis, an optical axis and a central position of a reflecting surface.

An object of the present disclosure, which has been made to resolve the above-described problem with the conventional technology, is to provide a light irradiation device in which the drive load is low even when scanning a planar-like image.

Means for Solving the Problem

A light irradiation device according to the present disclosure is a device that scans illuminating light, including a light source to emit light, a first reflecting surface to reflect and deflect the light emitted from the light source and forming a planar-like image, a second reflecting surface to reflect and deflect the light deflected by the first reflecting surface, and a rotation mechanism to rotate the first reflecting surface around a first central axis passing through a center of the first reflecting surface and to rotate the second reflecting surface around a second central axis passing through a center of the second reflecting surface. The first central axis is orthogonal to a first reference surface as a virtual plane that is 45 degrees inclined with respect to a first plane that is orthogonal to an optical axis of the light incident upon the first reflecting surface, the second central axis is orthogonal to a second reference surface as a virtual plane parallel to the first reference surface, and the first reflecting surface is inclined with respect to the first reference surface and the second reflecting surface is inclined with respect to the second reference surface.

Effect of the Invention

With the light irradiation device according to the present disclosure, it is possible to reduce the drive load even when scanning a planar-like image.

BRIEF DESCRIPTION OF THE DRAWINGS

FIG. 4A is a front view of a light source of the light irradiation device according to the first embodiment, FIG. 4B is a timing chart showing light emission control of the light source, and FIG. 4C is a diagram showing an example of a scan pattern formed by illuminating light.

FIG. 5 is a plan view showing the light source of a light irradiation device according to a first modification of the first embodiment.

FIG. 6A is a front view of a light source of a light irradiation device according to the first modification of the first embodiment, and FIG. 6B is a diagram showing an example of the scan pattern formed by the illuminating light.

FIG. 7 is a plan view showing a light source of a light irradiation device according to a second modification of the first embodiment.

FIG. 8 is a plan view showing a light source of a light irradiation device according to a third modification of the first embodiment.

MODE FOR CARRYING OUT THE INVENTION

Figure 1:
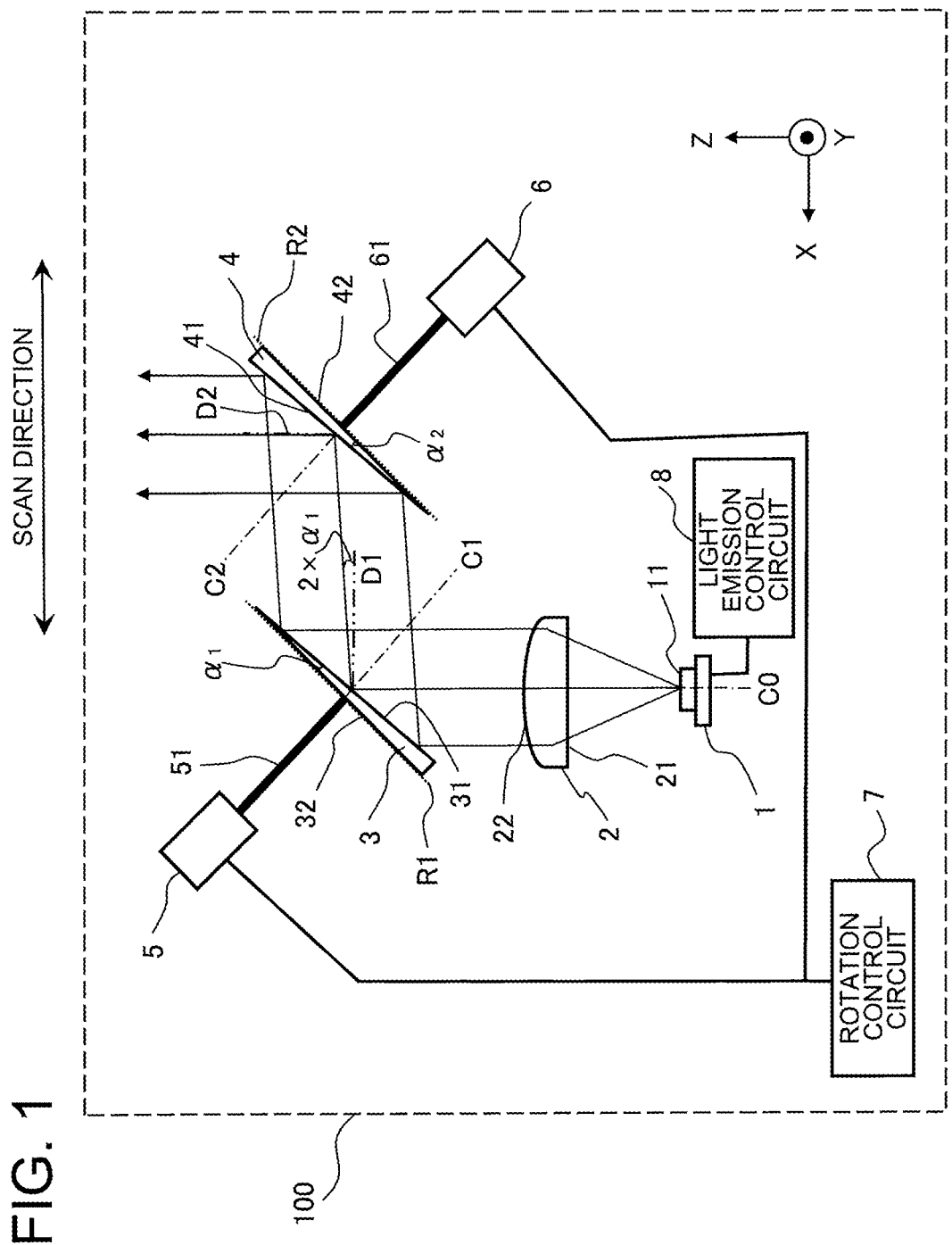
FIG. 1 is a diagram schematically showing the configuration of a light irradiation device according to a first embodiment and paths of principal rays of light.

A light irradiation device according to each embodiment will be described below with reference to the drawings. The following embodiments are just examples and a variety of modifications are possible.

The light irradiation device according to each embodiment can be used as a headlight device for a vehicle, a room illumination device or an image display device, for example.

The light irradiation device according to each embodiment emits an intended image in front of the light irradiation device by scanning light.

The light irradiation device according to each embodiment can be employed for a display device that displays an image by performing lighting control on the light source while scanning a projection image at high speed on an illuminated surface. Accordingly, the light irradiation device is capable of projecting image information onto a road surface, a passage or the like and thereby drawing attention, guiding a passerby, and so forth.

Further, the light irradiation device according to each embodiment can be employed for a downlight, a spotlight, a searchlight, a light fixture for a vehicle, or the like, for example.

The downlight is a small-sized light fixture among light fixtures attached to a ceiling in a building by embedding it in the ceiling. The downlight employing the light irradiation device according to each embodiment is capable of moving its irradiation region. It is also possible to provide the downlight with a function of projecting a projection image by performing the lighting control on the light source while scanning the projection image at high speed on the illuminated surface.

The spotlight is a light fixture for applying intense light concentratedly to a particular place. The spotlight is a light fixture that is used mainly in a theater or the like to attract attention of the audience and illuminates one point concentratedly. The spotlight employing the light irradiation device according to each embodiment is capable of moving its irradiation region without moving the spotlight.

The searchlight is an illumination device designed to illuminate up to a distant point in the nighttime. The searchlight is generally attached to an altazimuth mounting capable of swinging in an up/down direction and a left/right direction. The searchlight employing the light irradiation device according to each embodiment is capable of moving its irradiation region without using the altazimuth mounting.

The light irradiation device according to each embodiment is usable as a headlight for the high beam of a headlight device for a vehicle such as an automobile, for example. The high beam's illumination distance is 100 m, for example. The light irradiation device according to each embodiment is capable of implementing light distribution performance required of the high beam by scanning a projection image of the light source at high speed on the illuminated surface, for example.

The light irradiation device according to each embodiment is usable as a headlight for the low beam of a headlight device for a vehicle such as an automobile, for example. The low beam is used when the vehicle passes by an oncoming vehicle. The low beam's illumination distance is 30 m, for example. The light irradiation device according to each embodiment is capable of implementing light distribution performance required of the low beam by scanning a projection image of the light source at high speed on the illuminated surface, for example. Incidentally, the image scanned on the illuminated surface by the light irradiation device according to each embodiment is not limited to a projection image of the light source but can also be, for example, a first image which will be described later, that is, a light source image or a virtual light source image.

Further, the light irradiation device according to each embodiment is usable as a vehicle light fixture of a light distribution variable headlight system of an automobile or the like. The light distribution variable headlight system is a system that is referred to as an ADB (Adaptive Driving Beam) or the like, for example. With the ADB, it is possible to secure sufficient visibility by extinguishing only a region dazzling a vehicle in front, so as not to dazzle the vehicle in front when traveling by use of the high beam, while keeping on illuminating the other region with the high beam.

Incidentally, coordinate axes of an XYZ orthogonal coordinate system are indicated in the drawings. A forward direction of the light irradiation device is defined as a +Z-axis direction, and a rearward direction is defined as a −Z-axis direction. The forward direction of the light irradiation device is the direction in which illuminating light is emitted. More specifically, when a scan range of the scanned light is regarded as a light emission range and luminous flux emitted to the scan range is regarded as one emission light flux, a traveling direction of the light as the direction of an axis as the center of the emission light flux is referred to as an emission direction of the illuminating light. Further, an upper side of the light irradiation device is assumed to be in a +Y-axis direction, and a lower side is assumed to be in a −Y-axis direction. Furthermore, as facing the forward direction of the light irradiation device (i.e., the +Z-axis direction), the left side of the light irradiation device is assumed to be in a +X-axis direction, and the right side of the light irradiation device is assumed to be in a −X-axis direction.

(1) First Embodiment (1-1) Configuration of Light Irradiation Device 100

FIG. 1 is a diagram schematically showing the configuration of a light irradiation device 100 according to a first embodiment and paths of principal rays of light. As shown in FIG. 1, the light irradiation device 100 includes, for example, a light source 1, an image formation lens 2, a first mirror 3 as a first optical member having a first reflecting surface 31 that reflects and deflects light emitted from the light source 1, and a second mirror 4 as a second optical member having a second reflecting surface 41 that reflects and deflects light deflected by the first reflecting surface 31. Further, the light irradiation device 100 includes a first rotation mechanism 5, a second rotation mechanism 6, a rotation control circuit 7 and a light emission control circuit 8.

The first rotation mechanism 5 rotates the first reflecting surface 31 around a first central axis C1. The second rotation mechanism 6 rotates the second reflecting surface 41 around a second central axis C2. The first central axis C1 is orthogonal to a first reference surface R1 as a virtual plane that is 45 degrees inclined with respect to a first plane (i.e., XY plane) orthogonal to an optical axis C0 of light incident upon the first reflecting surface 31. The second central axis C2 is orthogonal to a second reference surface R2 as a virtual plane parallel to the first reference surface R1. The first reflecting surface 31 is an inclined surface that is inclined with respect to the first reference surface R1. The second reflecting surface 41 is an inclined surface that is inclined with respect to the second reference surface R2. Further, the first reflecting surface 31 and the second reflecting surface 41 face each other, a rotation direction of the first reflecting surface 31 and a rotation direction of the second reflecting surface 41 are directions opposite to each other, and angular speed of the rotation of the first reflecting surface 31 and angular speed of the rotation of the second reflecting surface 41 are equal to each other. The first central axis C1 passes through the center of the first reflecting surface 31, and the second central axis C2 passes through the center of the second reflecting surface 41.

The first mirror 3 includes a first bottom part 32 in a planar shape that is parallel to the first reference surface R1 orthogonal to the first central axis C1 of the first mirror 3 and the first reflecting surface 31 that is inclined with respect to the first reference surface R1 by an inclination angle $\alpha_1$ [degrees]. The second mirror 4 includes a second bottom part 42 in a planar shape that is parallel to the second reference surface R2 orthogonal to the second central axis C2 of the second mirror 4 and the second reflecting surface 41 that is inclined with respect to the second reference surface R2 by an inclination angle $\alpha_2$ [degrees]. Incidentally, the reflecting surface's side of the first reflecting surface 31 is referred to as a front side, and the first bottom part 32's side is referred to as a back side. The reflecting surface's side of the second reflecting surface 41 is referred to as a front side, and the second bottom part 42's side is referred to as a back side.

In a device that deflects light by using two inclined mirrors like the optical scanner described in the Patent Reference 1, the values of the inclination angles of the two mirrors differ from each other. In this case, the light emitted after being reflected by the two mirrors is emitted so as to form a scan pattern like petals on the illuminated surface.

In contrast, in the first embodiment, the inclination angle $\alpha_1$ [degrees] of the first reflecting surface 31 with respect to the first reference surface R1 and the inclination angle $\alpha_2$ [degrees] of the second reflecting surface 41 with respect to the second reference surface R2 are equal to each other. Further, the first mirror 3 and the second mirror 4 rotate in directions opposite to each other at the same angular speed. In this case, the first reflecting surface 31 and the second reflecting surface 41 are parallel to each other. The light scanned by the reflection by the first reflecting surface 31 of the first mirror 3 and the second reflecting surface 41 of the second mirror 4 moves on a straight line on the illuminated surface. Namely, the light reflected by the first reflecting surface 31 of the first mirror 3 and the second reflecting surface 41 of the second mirror 4 moves linearly in a direction (i.e., the X-axis direction) orthogonal to the direction of the optical axis C0 (i.e., the Z-axis direction).

<Light Source 1>

The light source 1 emits light. The light source 1 is, for example, a surface light source having a planar-like light emission surface 11 emitting light. The light source 1 is a solid-state light source such as an LED, for example. The "surface light source" is a light source that cannot be handled as a point source of light at the time of designing, for example. The following description will be given of a case where the light source 1 is an LED. Further, the optical axis C0 of the light source 1 is an axis orthogonal to the light emission surface 11 and passing through the center of the light emission surface 11.

Downsizing, weight reduction and electric power saving of the light irradiation device are being required from the viewpoint of reducing the load on the environment such as holding down carbon dioxide ($CO_2$) emission and fuel consumption and the viewpoint of energy saving. Thus, it is desired to employ a semiconductor light source (e.g., an LED or a laser diode (LD)) having higher luminous efficiency than conventional halogen bulbs (i.e., lamp light sources) as the light source 1 of the light irradiation device 100. Further, as the light source 1, it is also possible to use organic electroluminescence (organic EL) or a light source that irradiates fluorescent material applied on a plane surface with excitation light and thereby makes the fluorescent material emit light.

<Image Formation Lens 2>

The image formation lens 2 is a lens having positive power. The image formation lens 2 condenses the light emitted from the light source 1 and emits the light forward (in FIG. 1, towards the first reflecting surface 31 of the first mirror 3). The image formation lens 2 is capable of efficiently condensing the light emitted from the light source 1 in a case where the light source 1 is an LED having a large divergence angle. The image formation lens 2 can also be a lens that projects an image of the light emission surface 11 of the light source 1 (i.e., light source image). Namely, the image formation lens 2 can also be a lens that magnifies the light source image and emits the light source image forward. The focal point of the image formation lens 2 is situated on the light emission surface 11, for example. The image formation lens 2 collimates the light emitted from the light source 1, for example.

The focal position of the image formation lens 2 can also be a position deviated from the light emission surface 11. The image formation lens 2 can also be, for example, a lens that magnifies an image (referred to also as a "virtual light source image") on a virtual surface (referred to also as a "virtual light emission surface") formed based on the light emitted from the light source 1 and emits the image. In the following description, the light source image and the virtual light source image are not particularly discriminated from each other, and each of these images is referred to as an "image formed based on the light emitted from the light source 1". Further, the image formed based on the light emitted from the light source 1 is referred to also as a "first image". The magnification ratio of the first image in the illuminating light can be determined by the image formation lens 2.

The image formation lens 2 has positive power as a whole. The image formation lens 2 has an incidence surface 21 upon which the light is incident and an emission surface 22 that emits the light. The image formation lens 2 may have the structure in which the power of the emission surface 22 is higher than the power of the incidence surface 21. The image formation lens 2 employing such structure is capable of reducing the Fresnel loss at an optical interface and taking in more light from the light source 1 in comparison with a lens in which the power of the incidence surface 21 is higher than the power of the emission surface 22. Accordingly, the light utilization efficiency can be increased, and the quality of the beam can be improved even if the image formation lens 2 is downsized.

In the first embodiment, the optical axis of the image formation lens 2 coincides with the optical axis C0 of the light source 1. The image formation lens 2 is arranged between the light source 1 and the first mirror 3.

<First Mirror 3 and Second Mirror 4>

Figure 2A:
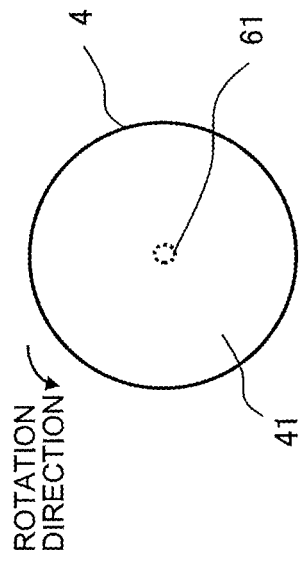
FIGS. 2A and 2B are a front view and a side view schematically showing the shape of a first mirror shown in FIG. 1, and FIGS. 2C and 2D are a front view and a side view schematically showing the shape of a second mirror shown in FIG. 1.
Figure 2B:
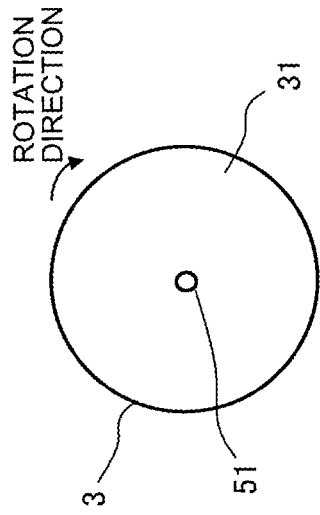
Figure 2C:
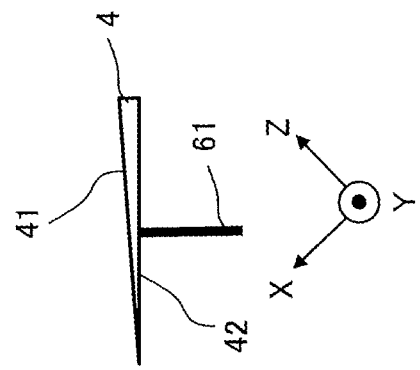
Figure 2D:
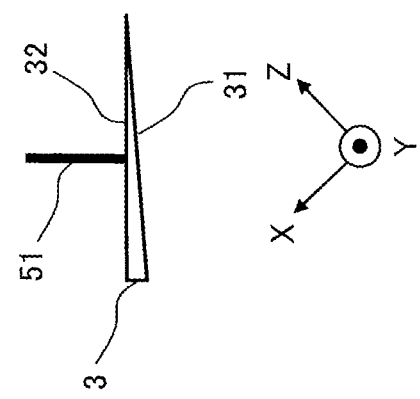

FIGS. 2A and 2B are a front view and a side view schematically showing the shape of the first mirror 3 shown in FIG. 1. FIGS. 2C and 2D are a front view and a side view schematically showing the shape of the second mirror 4 shown in FIG. 1. As shown in FIG. 1 and FIGS. 2A to 2D, the first mirror 3 has the first reflecting surface 31 that is inclined by the inclination angle $\alpha_1$ [degrees] with respect to the first reference surface R1 that is 45 degrees inclined with respect to the first plane (i.e., plane parallel to the XY plane and including a first reflection reference axis D1) orthogonal to the optical axis C0 of the light source 1. Further, the first mirror 3 has the first central axis C1 passing through the center of the first mirror 3 and orthogonal to the first reference surface R1. The first mirror 3 is held to be rotatable around the first central axis C1. In the first embodiment, the first central axis C1 is handled as a virtual optical axis of the first mirror 3 and the first reflecting surface 31.

Furthermore, the first mirror 3 may include the first bottom part 32 parallel to the first reference surface R1. The first bottom part 32 is a surface orthogonal to the first central axis C1. Namely, the first mirror 3 has the first bottom part 32 and the first reflecting surface 31 inclined with respect to the first bottom part 32, and its cross-sectional shape is a wedge shape. In this case, a rotary shaft 51 supporting the first mirror 3 is orthogonally connected to the first bottom part 32. Accordingly, the position of the rotary shaft 51 and the direction (i.e., angle) of the rotary shaft 51 can be set accurately. Namely, the cross-sectional shape of the first mirror 3 is a wedge shape and axial wobbling hardly occurs even when the first mirror 3 is rotated at high speed by the rotary shaft 51, and consequently, productivity of the first mirror 3 increases. As for the shape of the first mirror 3, the cross-sectional shape does not necessarily have to be the wedge shape and it is permissible if the first reflecting surface 31 is held to be rotatable around the rotary shaft 51 arranged at the position coinciding with the first central axis C1.

The first mirror 3 reflects and redirects (i.e., deflects) the light emitted from the image formation lens 2. The direction of the deflection of light by the first mirror 3 is a cone direction having an angle twice the inclination angle $\alpha_1$ [degrees] (i.e., $(2\times\alpha_1)$[degrees]) with respect to the first reflection reference axis D1 oriented in the traveling direction (−X-axis direction in FIG. 1) of the light reflected by the first mirror 3 as an axis passing through the center of the first mirror 3 shown in FIG. 1 and orthogonal to the optical axis of the incident light (optical axis C0 in FIG. 1). Here, the cone direction means a direction of traveling on a side face of a cone from the apex towards a certain point on the base (i.e., generatrix direction of the cone). For example, when the rotational position of the first mirror 3 receiving the light emitted from the image formation lens 2 is that shown in FIG. 1, the light reflected by the first mirror 3 is deflected to a direction that is inclined with respect to the first reflection reference axis D1 by the angle $(2\times\alpha_1)$ [degrees] in the +Z-axis direction.

The second mirror 4 has the second reflecting surface 41 that is inclined by the inclination angle $\alpha_2$ [degrees] with respect to the second reference surface R2 as a virtual plane 45 degrees inclined with respect to a second plane (i.e., plane parallel to the ZY plane) orthogonal to the first reflection reference axis D1 (X-axis direction in FIG. 1). Further, the second mirror 4 has the second central axis C2 passing through the center of the second mirror 4 and orthogonal to the second reference surface R2. The second mirror 4 is held to be rotatable around the second central axis C2. In the first embodiment, the inclination angle $\alpha_2$ [degrees] of the second mirror 4 is equal to the inclination angle $\alpha_1$ [degrees]. In the first embodiment, the second central axis C2 is handled as a virtual optical axis of the second mirror 4 and the second reflecting surface 41.

Furthermore, similarly to the first mirror 3, the second mirror 4 may include the second bottom part 42 parallel to the second reference surface R2. Here, the second bottom part 42 is a surface orthogonal to the second central axis C2. Namely, the second mirror 4 may be in a wedge shape having the second bottom part 42 and the second reflecting surface 41 inclined with respect to the second bottom part 42. Namely, the cross-sectional shape of the second mirror 4 is a wedge shape and the axial wobbling hardly occurs even when the second mirror 4 is rotated at high speed by a rotary shaft 61, and consequently, productivity of the second mirror 4 increases. Incidentally, the cross-sectional shape of the second mirror 4 is not necessarily limited to the wedge shape and it is permissible if the second reflecting surface 41 is held to be rotatable around the second central axis C2 as the rotation axis.

The second mirror 4 makes the second reflecting surface 41 reflect and redirect (i.e., deflect) the light reflected by the first mirror 3. The direction of the deflection of light (in this example, light incident at the 45-degree angle with respect to the second central axis C2) by the second mirror 4 is a cone direction having an apical angle $(2\times\alpha_2)$[degrees], twice the inclination angle $\alpha_2$ [degrees], with respect to a second reflection reference axis D2 oriented in the traveling direction (+Z-axis direction in FIG. 1) of the light reflected by the second mirror 4 as an axis passing through the center of the second mirror 4 shown in FIG. 1 and orthogonal to the first reflection reference axis D1.

For example, when the rotational condition of the second mirror 4 receiving the light emitted from the first mirror 3 is that shown in FIG. 1, the light incident at the 45-degree angle with respect to the second central axis C2 is deflected by the second mirror 4 to a direction that is inclined with respect to the second reflection reference axis D2 by the angle $(2\times\alpha_2)$ [degrees] in the +X-axis direction. Incidentally, in the example of FIG. 1, the light emitted from the first mirror 3 has been deflected to the direction inclined with respect to the first reflection reference axis D1 (the X-axis in this example) by the angle $(2\times\alpha_1)$ [degrees] in the +Z-axis direction, and thus the light is incident upon the second mirror 4 at an incidence angle of $(45+(2\times\alpha_2))$ [degrees] with respect to the second central axis C2. In this case, if the second reflecting surface 41 is not inclined with respect to the second reference surface R2, the light is deflected to a direction inclined with respect to the second reflection reference axis D2 by the angle $(2\times\alpha_1)$ [degrees] in the −X-axis direction. In this example, the second reflecting surface 41 is inclined with respect to the second reference surface R2 by the inclination angle $\alpha_2$ [degrees] as mentioned earlier. Thus, in the example of FIG. 1, for the light emitted from the first mirror 3, a deflection effect of the angle $(2\times\alpha_2)$ [degrees] in the +X-axis direction is added to the emission direction of the reflected light with reference to the second central axis C2. This is because the normal direction of the second reflecting surface 41 is inclined in the +X-axis direction by an angle of $+\alpha_2$ [degrees] in the condition of FIG. 1. Here, $\alpha_1=\alpha_2$ holds. Accordingly, in the case of FIG. 1, the light reflected by the second mirror 4 turns into light parallel to the +Z-axis and is emitted in the +Z-axis direction.

Figure 3:
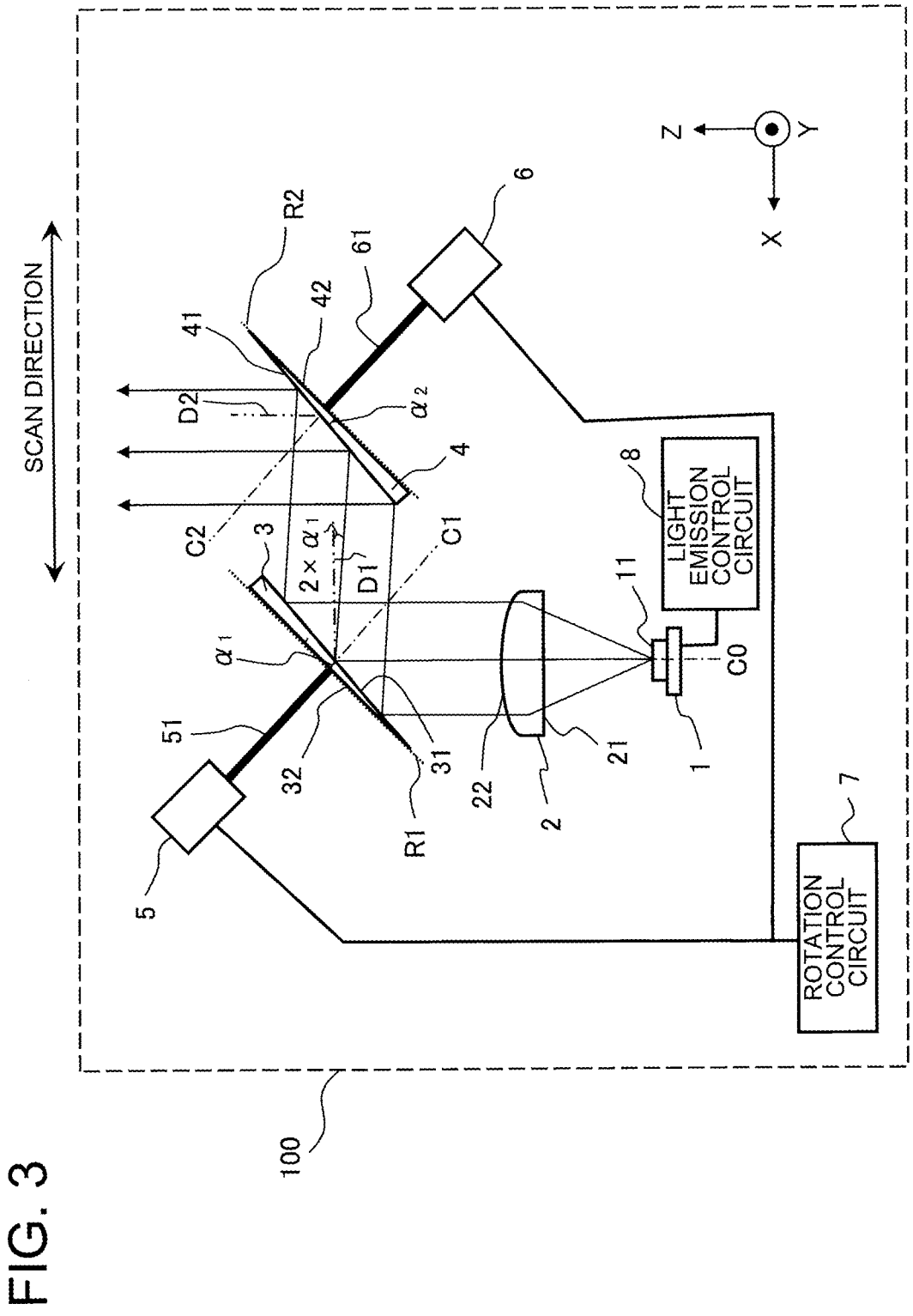
FIG. 3 is a diagram schematically showing the configuration of the light irradiation device according to the first embodiment and paths of principal rays of light in a case where inclinations of the first mirror and the second mirror differ from inclinations in FIG. 1.

FIG. 3 is a diagram schematically showing the configuration of the light irradiation device 100 and paths of principal rays of light in a case where the inclinations of the first mirror 3 and the second mirror 4 differ from the inclinations in FIG. 1. FIG. 3 shows a condition where the first mirror 3 and the second mirror 4 have rotated by 180 degrees respectively around the first central axis C1 and the second central axis C2 from the condition of FIG. 1. As shown in FIG. 3, since $\alpha_1=\alpha_2$ holds, that is, the first reflecting surface 31 and the second reflecting surface 41 are parallel to each other, the light emitted from the light source 1 and collimated by the image formation lens 2 is reflected by the first reflecting surface 31, reflected by the second reflecting surface 41, and travels in the +Z-axis direction. The position of the light incident upon the second reflecting surface 41 in the case of FIG. 3 is situated in the +X-axis direction relative to the position of the light incident upon the second reflecting surface 41 in the case of FIG. 1. Thus, the position of the illuminating light emitted from the light irradiation device 100 in the case of FIG. 3 has moved in the +X-axis direction from the position of the illuminating light in the case of FIG. 1.

<First Rotation Mechanism 5 and Second Rotation Mechanism 6>

The first rotation mechanism 5 rotates the first mirror 3. The first rotation mechanism 5 includes the rotary shaft 51 parallel to the first central axis C1 of the first mirror 3. The rotary shaft 51 is a shaft that transmits turning force of the first rotation mechanism 5 to the first mirror 3. The rotary shaft 51 is orthogonally connected to the first bottom part 32 of the first mirror 3, for example.

The second rotation mechanism 6 rotates the second mirror 4. The second rotation mechanism 6 includes the rotary shaft 61 parallel to the second central axis C2 of the second mirror 4. The rotary shaft 61 is a shaft that transmits turning force of the second rotation mechanism 6 to the second mirror 4. The rotary shaft 61 is orthogonally connected to the second bottom part 42 of the second mirror 4, for example.

The first rotation mechanism 5 and the second rotation mechanism 6 are motors, for example. The motors are drive units such as stepping motors or DC (Direct Current) motors, for example.

The first rotation mechanism 5 is desired to be arranged on the back side of the first reflecting surface 31 of the first mirror 3 as the rotation target. The second rotation mechanism 6 is desired to be arranged on the back side of the second reflecting surface 41 of the second mirror 4 as the rotation target. This is because blockage of light by the rotary shaft 51 and the rotary shaft 61 can be eliminated and a drop in the light utilization efficiency can be avoided by arranging the rotary shaft 51 on the back side of the first reflecting surface 31 and arranging the rotary shaft 61 on the back side of the second reflecting surface 41. However, the positions of the first rotation mechanism 5 and the second rotation mechanism 6 are not necessarily limited to the positions shown in FIG. 1 and FIG. 3. The first rotation mechanism 5 may be arranged on the first reflecting surface 31's side. Alternatively, the second rotation mechanism 6 may be arranged on the second reflecting surface 41's side. Such configurations have advantages in that the degree of freedom of the arrangement of the rotation mechanisms increases and the entire device can be downsized.

<Rotation Control Circuit 7>

The rotation control circuit 7 controls rotation amounts and rotation speeds of the first rotation mechanism 5 and the second rotation mechanism 6. Incidentally, the control of the second rotation mechanism 6 may be executed by a rotation control circuit other than the rotation control circuit 7.

The rotation control circuit 7 controls rotation directions of the first rotation mechanism 5 and the second rotation mechanism 6 to be opposite to each other, for example. Alternatively, the rotation control circuit 7 controls the rotation directions of the first rotation mechanism 5 and the second rotation mechanism 6 to be opposite to each other and controls their rotation amounts and rotation speeds to be equal to each other. By such control, the first image or a second image can be scanned linearly on the illuminated surface. Incidentally, the rotation directions, the rotation amounts and the rotation speeds of the first rotation mechanism 5 and the second rotation mechanism 6 are not limited to the above-described examples but can be set in various ways depending on the intended scan pattern.

Further, when the pair of mirrors makes one revolution, the image on the illuminated surface moves to and fro once on a straight line. In general, in order to present smooth display images to human eyes with no feeling of strangeness, 20 fps (20 frames/sec) or higher is necessary. Accordingly, the revolution speeds of the first rotation mechanism 5 and the second rotation mechanism 6 are desired to be 600 rpm (600 revolutions/min) or higher.

<Light Emission Control Circuit 8>

The light emission control circuit 8 executes light emission control of the light source 1. FIG. 4A is a front view of the light source 1 of the light irradiation device 100, FIG. 4B is a timing chart showing the light emission control of the light source 1, and FIG. 4C is a diagram showing an example of the scan pattern formed by the illuminating light. By executing the light emission control in a time series as shown in FIG. 4B, it is possible to perform lighting/extinguishing at intended positions on the illuminated surface and form an intended scan pattern as shown in FIG. 4C. In other words, the light emission control circuit 8 temporally controls at least one of the light amount and the scan pattern of the illuminating light via the light emission control of the light source 1. Further, as mentioned earlier, in a case where the light source 1 includes a plurality of light emission surfaces 11 (i.e., first to third modifications which will be described later), the light emission control circuit 8 may temporally control at least one of the light amount and an irradiation pattern of the illuminating light by controlling the amount of light emitted from each light emission surface 11 independently of each other as the light emission control of the light source 1.

(1-2) Formation of Projection Image by Image Formation Lens

The image formation lens 2 has positive power as a whole. The image formation lens 2 magnifies an image on a predetermined surface (i.e., the first image) formed based on the light emitted from the light source 1 and emits the image. In the following description, the image on the surface formed based on the light emitted from the light source 1 without using the image formation lens 2 is referred to as the first image, and the magnified image of the first image formed by the image formation lens 2 based on the light emitted from the light source 1 is referred to also as the second image or the projection image of the light source. Incidentally, it is assumed in this example that the first image as the image formed based on the light emitted from the light source 1 is a planar-like image and the second image or the projection image of the light source as the magnified image of the first image is also a planar-like image.

The light source 1 used by the light irradiation device 100 according to the first embodiment is, for example, a surface-emitting light source having a large area of the light emission surface and a large divergence angle of light. Here, the large divergence angle means that the divergence angle (i.e., half angle) is 5 degrees or more. The light just after being emitted from such a surface-emitting light source diverges. The aforementioned example of the Patent Reference 1 is an example in which the light source is a laser light source, and thus has a problem in that each mirror and the light source have to be separated from each other by a distance at which the light source can be regarded as a point source of light and the device increases in size in a case where the light source is a surface-emitting light source that cannot be regarded as a point source of light. Further, since it is necessary to make the diverging light enter an effective region of a set of deflecting functions, each mirror itself also increases in size and an increase in the drive load due to the enlargement of each mirror also becomes a problem. In this example, to deal with such a problem, reduction in the drive load is made possible by defining a central axis of rotation for each reflecting surface and using the defined central axis as the rotation axis. Further, downsizing of the subsequent optical system (especially, the first reflecting surface 31 and the second reflecting surface 41) is made possible by providing the image formation lens 2 having positive power between the light source 1 and the first mirror 3. In this case, the optical axis of the image formation lens 2 may coincide with the optical axis C0 of the light source 1. Incidentally, the image formation lens 2 is not necessarily essential but can be left out when the device size does not matter.

(1-3) Scanning of Light

The light irradiation device 100 is capable of emitting light to a wide range in front by linearly scanning the projection image of the light source 1 at high speed on the illuminated surface. Here, linearly scanning an image on the illuminated surface means, more specifically, scanning the light foaming the image on the illuminated surface (i.e., the illuminating light emitted from the light irradiation device 100) on a straight line.

For example, the width of the light distribution in a horizontal direction parallel to the road surface required of a headlight for a vehicle is approximately ±60 degrees. The width of the light distribution of the light irradiation device 100 is determined by the inclination angles $\alpha_1$ [degrees] and $\alpha_2$ [degrees] of the first reflecting surface 31 and the second reflecting surface 41 of the first mirror 3 and the second mirror 4. With the increase in the inclination angles $\alpha_1$ [degrees] and $\alpha_2$ [degrees] of the first reflecting surface 31 and the second reflecting surface 41, a scan width as the width of light scanned on the illuminated surface, that is, the width of the light distribution, becomes wider. On the other hand, as the scan width becomes wider, the illuminance per unit area on the illuminated surface lowers. Namely, the width of irradiating with light and the illuminance on the illuminated surface are in a trade-off relationship and it is necessary to set both values appropriately.

In consideration of the trade-off relationship between the width of irradiating with light and the illuminance on the illuminated surface, the scan width is desired to be set within ±60 degrees in a headlight for a vehicle. Namely, the setting is desired to be made to satisfy $\alpha_1=\alpha_2$ and $\alpha_1 \leq 15$ degrees.

With such a setting, useless scan regions are eliminated in the headlight for a vehicle, and thus the illuminance on the illuminated surface can be increased to the maximum.

(1-4) First Modification

While the description of the light irradiation device 100 shown in FIG. 1 to FIG. 4 has been given of the case where the light source 1 has one light emission surface 11, the light source 1 is not limited to such structure. The light source 1 can have a plurality of light emission surfaces. For example, the light irradiation device 100 may include a plurality of surface-emitting light sources each having a planar-like light emission surface as the light source 1.

FIG. 5 is a plan view showing the light source 1 of a light irradiation device according to a first modification of the first embodiment. The light irradiation device according to the first modification differs from the light irradiation device shown in FIG. 1 to FIG. 4 in that the light source 1 includes a plurality of surface-emitting light sources 1a, 1b, 1c, 1d, 1e and 1f having a plurality of planar-like light emission surfaces 11a, 11b, 11c, 11d, 11e and 11f arranged in a second direction (Y-axis direction) orthogonal to a first direction (X-axis direction) parallel to a scan direction.

FIG. 6A is a front view of the light source 1 of the light irradiation device according to the first modification of the first embodiment and FIG. 6B is a diagram showing an example of the scan pattern formed by the illuminating light. In the case of employing the light source 1 including the plurality of surface-emitting light sources 1a, 1b, 1c, 1d, 1e and 1f as shown in FIG. 6A, it is possible to perform the lighting/extinguishing at any intended position on the illuminated surface and form an intended scan pattern as shown in FIG. 6B by executing the light emission control of each surface-emitting light source in a time series. Namely, the light distribution control becomes possible also in the direction orthogonal to the scan direction as the direction in which an irradiation position of the illuminating light moves by individually performing the lighting control on each light emission surface. Namely, the light distribution control becomes possible not only in the scan direction of the illuminating light but also in the second direction orthogonal to the scan direction of the illuminating light. Accordingly, light beams emitted from the plurality of surface-emitting light sources 1a, 1b, 1c, 1d, 1e and 1f are superimposed together and a planar-like image in a predetermined shape is famed, by which more elaborate light distribution control is made possible.

(1-5) Second Modification

FIG. 7 is a plan view showing the light source 1 of a light irradiation device according to a second modification of the first embodiment. The light source 1 in the second modification includes a plurality of surface-emitting light sources 1a, 1b, 1c, 1d, 1e and 1f having a plurality of light emission surfaces 11a, 11b, 11c, 11d, 11e and 11f arranged in the direction (Y-axis direction) orthogonal to the scan direction (X-axis direction). The light source 1 in the second modification differs from the light source in the first modification in that light emission surfaces adjoining each other in the Y-axis direction (e.g., the light emission surfaces 11a and 11b) are arranged at X-axis direction positions deviated from each other. In the light source arrangement in the first modification shown in FIG. 5, focusing on the boundary between the light emission surfaces 11a and 11b, for example, there exists a gap between a lower side 11ad of the light emission surface 11a and an upper side 11bu of the light emission surface 1ib. Namely, there exists a non-light emission region between the light emission surfaces 11a and 11b. Accordingly, also on the illuminated surface, there occurs a non-irradiation region due to the non-light emission region.

In the second modification, as shown in FIG. 7, the odd-numbered light emission surfaces 11a, 11c and 11e and the even-numbered light emission surfaces 11b, 11d and 11f are arranged while shifting them from each other in the scan direction and so that they partially overlap with each other in the Y-axis direction. Namely, the plurality of surface-emitting light sources 1a, 1b, 1c, 1d, 1e and 1f are arranged so that the light emission surfaces 11a, 11b, 11c, 11d, 11e and 11f of the plurality of surface-emitting light sources 1a, 1b, 1c, 1d, 1e and 1f are arranged in two columns in the Y-axis direction and the X-axis direction positions of light emission surfaces adjoining each other in the Y direction differ from each other. Specifically, the odd-numbered light emission surfaces 11a, 11c and lie are aligned in one column in the Y-axis direction, the even-numbered light emission surfaces 11b, 11d and 11f are aligned in one column in the Y-axis direction at a position separate in the scan direction from the column of the odd-numbered light emission surfaces 11a, 11c and lie, and the odd-numbered light emission surfaces 11a, 11c and 11e and the even-numbered light emission surfaces 11b, 11d and 11f partially overlap with each other in the Y-axis direction.

In the second modification, in sets of two light emission surfaces (in the example of FIG. 7, a set of the light emission surfaces 11a and 11b, a set of the light emission surfaces 11b and 11c, a set of the light emission surfaces 11c and 11d, a set of the light emission surfaces 11d and 11e and a set of the light emission surfaces 11e and 11f), the lower side of the upper-side light emission surface (11ad in the set of the light emission surfaces 11a and 11b in FIG. 7, for example) and the upper side of the lower-side light emission surface (11ad in the set of the light emission surfaces 11a and 11b in FIG. 7, for example) are arranged at the same height or arranged so that the upper side of the lower-side light emission surface is higher than the lower side of the upper-side light emission surface. With such arrangement, the gap between the lower side of the upper-side light emission surface and the upper side of the lower-side light emission surface can be eliminated and the aforementioned non-irradiation regions can be eliminated on the illuminated surface.

(1-6) Third Modification

FIG. 8 is a plan view showing the light source 1 of a light irradiation device according to a third modification of the first embodiment. The light source 1 in the third modification shown in FIG. 8 has the structure further including light emission surfaces 11g and 11h adjoining the light emission surface 11f of the light source in FIG. 5 in the scan direction. With such a configuration, the light amount at a horizontal direction position corresponding to the light emission surface 11f can be increased. Put another way, in a case where the light amount is insufficient with the light emission surface 11f alone, a desired light amount can be obtained by providing a plurality of light emission surfaces aligned in the scan direction. Incidentally, while a plurality of light emission surfaces aligned in the scan direction are arranged as the light emission surfaces lowermost in the Y-axis direction in the example of FIG. 8, the Y-axis direction position where a plurality of light emission surfaces are arranged in the scan direction can also be a different position. In the configuration including a plurality of light emission surfaces in the Y-axis direction, it is possible to either arrange a plurality of light emission surfaces as light emission surfaces at each Y-axis direction position or arrange a plurality of light emission surfaces at one position or two or more positions among a plurality of Y-axis direction positions. It is also possible to set the number of light emission surfaces in the Y-axis direction at one and arrange a plurality of light emission surfaces in the scan direction. Further, also in configurations in which the light emission surfaces are arranged while shifting them from each other in the left/right direction as shown in FIG. 7, it is possible to provide each light emission surface or some of the light emission surfaces with one or more light emission surfaces further arranged in the scan direction.

(2) Second Embodiment

Figure 9:
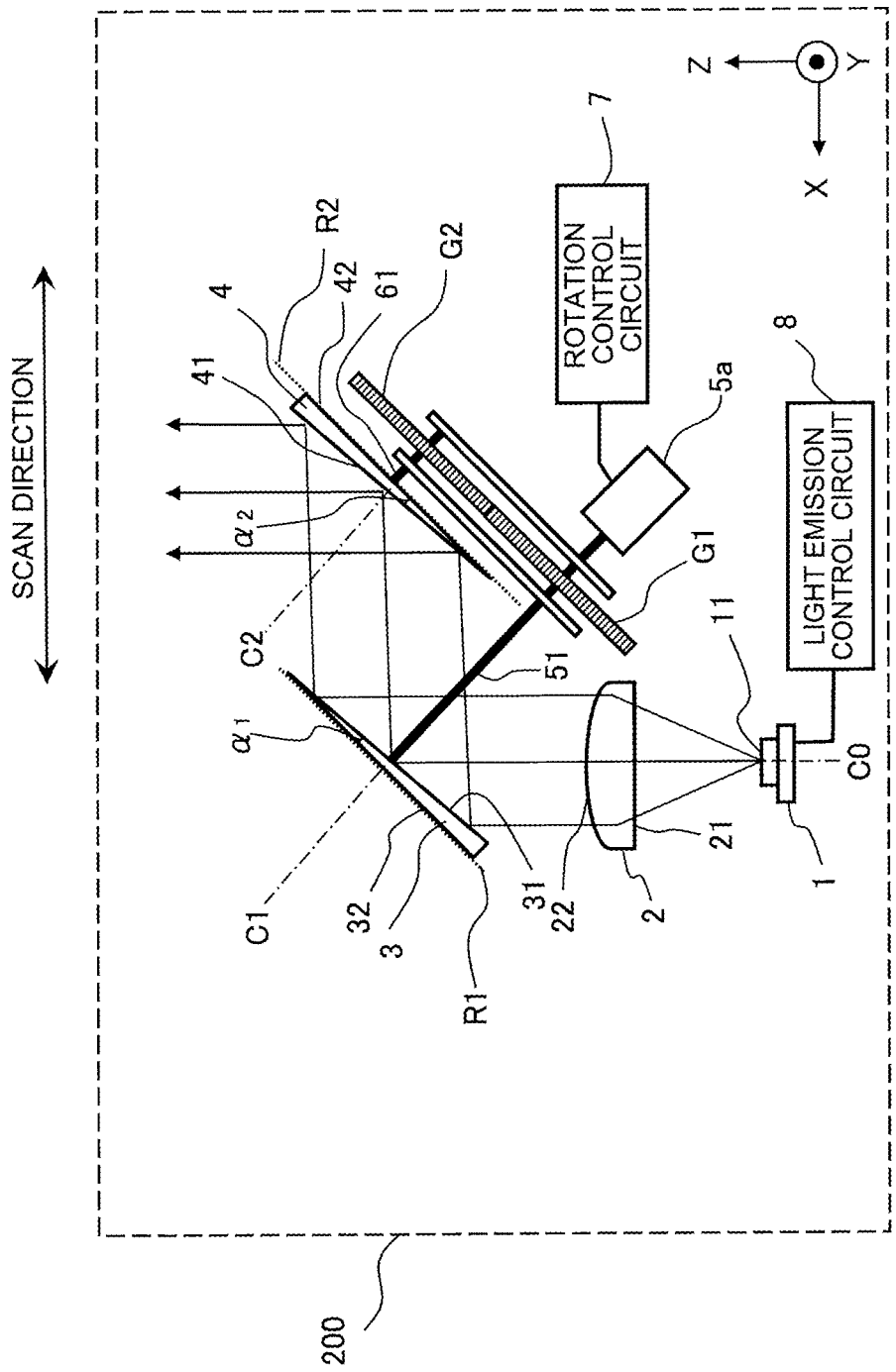
FIG. 9 is a diagram schematically showing the configuration of a light irradiation device according to a second embodiment and paths of principal rays of light.

FIG. 9 is a diagram schematically showing the configuration of a light irradiation device 200 according to a second embodiment and paths of principal rays of light. In FIG. 9, each component identical or corresponding to a component shown in FIG. 1 is assigned the same reference character as in FIG. 1. The light irradiation device 200 differs from the light irradiation device 100 according to the first embodiment in including one rotation mechanism 5a instead of the first and second rotation mechanisms 5 and 6 in the first embodiment and in having the structure for transmitting turning force of the one rotation mechanism 5a to both of the rotary shaft 51 of the first mirror 3 and the rotary shaft 61 of the second mirror 4. Except for the above-described features, the light irradiation device 200 is the same as the light irradiation device 100.

In the light irradiation device 200, the first mirror 3 is supported by the rotary shaft 51. The rotary shaft 51 is coaxial with the first central axis C1 and is provided on the first reflecting surface 31's side of the first mirror 3.

In the light irradiation device 200, the second mirror 4 is supported by the rotary shaft 61. The rotation mechanism 5a transmits its turning force by using a component of a power transmission mechanism such as a gear and thereby rotates the second mirror 4 as well. In the example of FIG. 9, a gear G1 is provided on the rotary shaft 51 of the rotation mechanism 5a, and a gear G2 is provided on the rotary shaft 61 on the back side of the second mirror 4. The gear G1 transmits the turning force of the rotation mechanism 5a to the gear G2. The second mirror 4 rotates together with the rotating gear G2. Further, by setting the gear ratio of the gear G1 and the gear G2 at 1:1, the first mirror 3 and the second mirror 4 can be rotated at the same angular speed and in directions opposite to each other. With such a configuration, the projection image of the light source 1 can be linearly scanned on the illuminated surface.

By employing the configuration of the light irradiation device 200 according to the second embodiment, the projection image of the light source 1 can be linearly scanned on the illuminated surface with one rotation mechanism 5a. Accordingly, the device size can be downsized. Further, the product cost can be reduced thanks to the reduction in the number of components.

Incidentally, while terms indicating a positional relationship between components or the shape of a component, such as "parallel" and "orthogonal", are used in the above embodiments, these terms are intended to include a range allowing for tolerances in the manufacture, variations in the assembly, or the like.

Further, while the embodiments have been described as above, the light irradiation device is not limited to the examples in these embodiments.

DESCRIPTION OF REFERENCE CHARACTERS 100, 200: light irradiation device, 1: light source, 1a, 1b, 1c, 1d, 1e, 1f: surface-emitting light source, 11, 11a, 11b, 11c, 11d, 11e, 11f: light emission surface, 11ad: light emission surface upper side, 11bu: light emission surface lower side, 2: image formation lens, 21: incidence surface, 22: emission surface, 3: first mirror, 31: first reflecting surface, 4: second mirror, 41: second reflecting surface, 5: first rotation mechanism, 5a: rotation mechanism, 51: rotary shaft, 6: second rotation mechanism, 61: rotary shaft, 7: rotation control circuit, 8: light emission control circuit, G1, G2: gear, $\alpha_1$, $\alpha_2$: inclination angle, R1: first reference surface, R2: second reference surface, C0: optical axis, C1: first central axis, C2: second central axis.

What is claimed is:

1. A light irradiation device that scans illuminating light, comprising:
   a light source to emit light;
   a first reflecting surface to reflect and deflect the light emitted from the light source and forming a planar-like image;
   a second reflecting surface to reflect and deflect the light deflected by the first reflecting surface; and
   a rotation mechanism to rotate the first reflecting surface around a first central axis passing through a center of the first reflecting surface and to rotate the second reflecting surface around a second central axis passing through a center of the second reflecting surface, wherein the first central axis is orthogonal to a first reference surface as a virtual plane that is 45 degrees inclined with respect to a first plane that is orthogonal to an optical axis of the light incident upon the first reflecting surface, the second central axis is orthogonal to a second reference surface as a virtual plane parallel to the first reference surface, and the first reflecting surface is inclined with respect to the first reference surface and the second reflecting surface is inclined with respect to the second reference surface.

2. The light irradiation device according to claim 1, further comprising an image formation lens that is arranged between the light source and the first reflecting surface and emits light that forms a second image as a magnified image of a first image that is an image formed by the light emitted from the light source, wherein the first reflecting surface deflects the light emitted from the image formation lens.

3. The light irradiation device according to claim 2, wherein the image formation lens has positive power, and a magnification ratio of the second image with respect to the first image in the illuminating light is determined by the image formation lens.

4. The light irradiation device according to claim 2, wherein the image formation lens has an incidence surface upon which the light emitted from the light source is incident and an emission surface from which the light is emitted, and power of the emission surface is higher than power of the incidence surface.

5. The light irradiation device according to claim 1, wherein the rotation mechanism includes two rotary shafts and a motor to apply turning force to at least one of the two rotary shafts.

6. The light irradiation device according to claim 5, wherein one of the two rotary shafts is connected to a back side of the first reflecting surface, and the other of the two rotary shafts is connected to a back side of the second reflecting surface.

7. The light irradiation device according to claim 5, wherein at least one of the two rotary shafts is connected to a front side of the first reflecting surface or a front side of the second reflecting surface.

8. The light irradiation device according to claim 5, wherein the rotation mechanism further includes a power transmission mechanism to transmit the turning force applied from the motor to the other rotary shaft.

9. The light irradiation device according to claim 1, wherein the light source is a surface-emitting light source.

10. The light irradiation device according to claim 1, wherein a divergence angle of the light emitted from the light source is 5 degrees or more.

11. The light irradiation device according to claim 1, wherein the light source includes a plurality of surface-emitting light sources each having a planar-like light emission surface, and light beams emitted from the plurality of surface-emitting light sources are superimposed together and a planar-like image in a predetermined shape is formed.

12. The light irradiation device according to claim 11, wherein when a direction parallel to a scan direction as a direction in which an irradiation position of the illuminating light moves on a plane orthogonal to an emission direction of the illuminating light is represented as a first direction and a direction orthogonal to both of the emission direction and the first direction is represented as a second direction, the plurality of surface-emitting light sources are arranged so that light emission surfaces of the plurality of surface-emitting light sources are arranged in the second direction.

13. The light irradiation device according to claim 11, wherein when a direction parallel to a scan direction as a direction in which an irradiation position of the illuminating light moves on a plane orthogonal to an emission direction of the illuminating light is represented as a first direction and a direction orthogonal to both of the emission direction and the first direction is represented as a second direction, the plurality of surface-emitting light sources are arranged so that light emission surfaces of the plurality of surface-emitting light sources are arranged in the second direction and first direction positions of light emission surfaces adjoining each other in the second direction differ from each other.

14. The light irradiation device according to claim 11, wherein when a direction parallel to a scan direction as a direction in which an irradiation position of the illuminating light moves on a plane orthogonal to an emission direction of the illuminating light is represented as a first direction, the plurality of surface-emitting light sources are arranged so that light emission surfaces of the plurality of surface-emitting light sources are arranged in the first direction.

15. The light irradiation device according to claim 1, further comprising a light emission control circuit to execute light emission control of the light source, wherein the light emission control circuit temporally controls at least one of a light amount of the illuminating light and an irradiation pattern of the illuminating light via the light emission control of the light source.

16. The light irradiation device according to claim 15, wherein in a case where the light source includes a plurality of light emission surfaces, the light emission control circuit temporally controls at least one of the light amount and the irradiation pattern of the illuminating light by controlling the light amount of light emitted from each of the plurality of light emission surfaces independently of each other as the light emission control of the light source.

17. The light irradiation device according to claim 1, wherein an inclination angle of the first reflecting surface with respect to the first reference surface and an inclination angle of the second reflecting surface with respect to the second reference surface are equal to each other.

18. The light irradiation device according to claim 1, comprising a first optical member and a second optical member each including a bottom part and an inclined surface that is inclined with respect to the bottom part and each having a cross section in a wedge shape, wherein the first reflecting surface is formed on the inclined surface of the first optical member when the bottom part of the first optical member is regarded as the first reference surface, and the second reflecting surface is formed on the inclined surface of the second optical member when the bottom part of the second optical member is regarded as the second reference surface.

19. The light irradiation device according to claim 1, wherein an inclination angle of the first reflecting surface with respect to the first reference surface and an inclination angle of the second reflecting surface with respect to the second reference surface are less than or equal to 15 degrees.

20. The light irradiation device according to claim 1, wherein a rotation direction of the first reflecting surface and a rotation direction of the second reflecting surface are directions opposite to each other and angular speed of the rotation of the first reflecting surface and angular speed of the rotation of the second reflecting surface are equal to each other.

* * * * *